(12) United States Patent
Suzuki

(10) Patent No.: US 12,095,353 B2
(45) Date of Patent: Sep. 17, 2024

(54) CAPACITOR MODULE AND POWER CONVERSION DEVICE

(71) Applicant: DENSO CORPORATION, Kariya (JP)

(72) Inventor: Yuuki Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 156 days.

(21) Appl. No.: 17/872,402

(22) Filed: Jul. 25, 2022

(65) Prior Publication Data

US 2022/0360164 A1    Nov. 10, 2022

Related U.S. Application Data

(63) Continuation of application No. PCT/JP2021/003556, filed on Feb. 1, 2021.

(30) Foreign Application Priority Data

Mar. 27, 2020   (JP) ................................ 2020-058522

(51) Int. Cl.
| | |
|---|---|
| *H02M 7/00* | (2006.01) |
| *H01G 4/38* | (2006.01) |
| *H02M 1/15* | (2006.01) |
| *H02M 1/44* | (2007.01) |
| *H02M 7/48* | (2007.01) |

(52) U.S. Cl.
CPC ................ *H02M 1/15* (2013.01); *H01G 4/38* (2013.01); *H02M 1/44* (2013.01); *H02M 7/003* (2013.01); *H02M 7/48* (2013.01)

(58) Field of Classification Search
CPC .......... H02M 1/14; H02M 1/143; H02M 1/15; H02M 1/44; H02M 7/003; H02M 7/48; H02M 7/53; H02M 7/537; H02M 7/5387
See application file for complete search history.

(56) References Cited

U.S. PATENT DOCUMENTS

| | | | |
|---|---|---|---|
| 2004/0257841 A1 | 12/2004 | Taguchi et al. | |
| 2016/0374229 A1 | 12/2016 | Nishikimi | |
| 2017/0063218 A1* | 3/2017 | Nishizawa | ............ H02M 7/003 |
| 2019/0198246 A1 | 6/2019 | Kanda et al. | |

FOREIGN PATENT DOCUMENTS

JP            4425831 B2       3/2010

OTHER PUBLICATIONS

Apr. 13, 2021 International Search Report issued in International Patent Application No. PCT/JP2021/003556.

* cited by examiner

*Primary Examiner* — Gary L Laxton
(74) *Attorney, Agent, or Firm* — Oliff PLC

(57) ABSTRACT

A capacitor module includes a smoothing capacitor, a P-side Y capacitor and a N-side Y capacitor as noise absorbing capacitors, a capacitor case, a P-side bus bar, a N-side bus bar, and a ground bus bar. A virtual plane along a P-side electrode surface, which is an electrode surface on a high potential side of the smoothing capacitor, is referred to as a P-side virtual plane. A virtual plane along a N-side electrode surface, which is an electrode surface on a low potential side of the smoothing capacitor, is referred to as a N-side virtual plane. A region between the P-side virtual plane and the N-side virtual plane is defined as a PN region. The entire noise absorbing capacitor and the entire ground bus bar are arranged in the PN region.

13 Claims, 8 Drawing Sheets

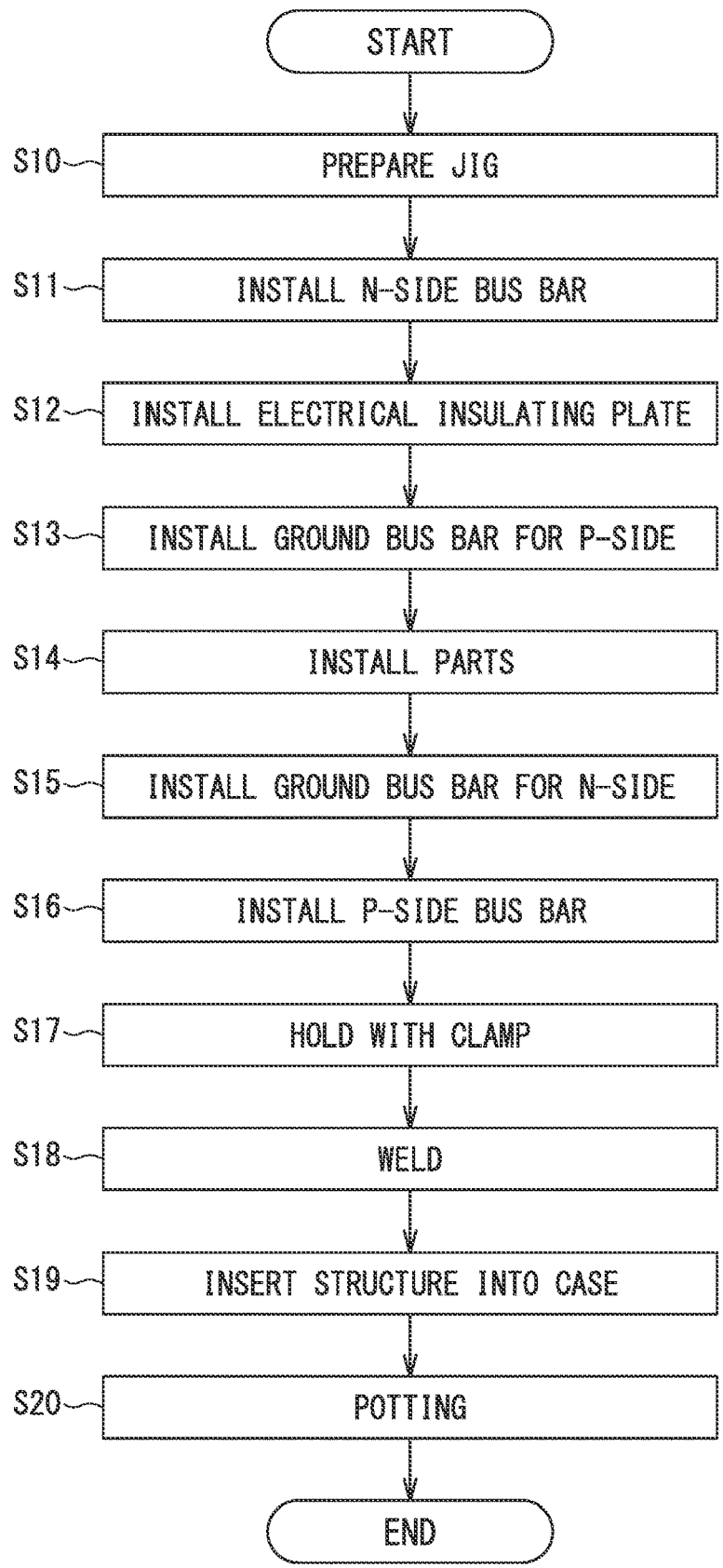

US 12,095,353 B2

CAPACITOR MODULE AND POWER CONVERSION DEVICE

CROSS REFERENCE TO RELATED APPLICATIONS

The present application is a continuation application of International Patent Application No. PCT/JP2021/003556 filed on Feb. 1, 2021, which designated the U.S. and claims the benefit of priority from Japanese Patent Application No. 2020-058522 filed in Japan filed on Mar. 27, 2020, the entire disclosure of the above application is incorporated herein by reference.

TECHNICAL FIELD

A disclosure herein relates to a capacitor module with a smoothing capacitor and a noise absorbing capacitor, and a power conversion device.

BACKGROUND

A power conversion device converts DC power into AC power and outputs it by operating a plurality of switching elements forming an upper and lower arm circuit.

SUMMARY

A capacitor module according to one aspect of the present disclosure includes a smoothing capacitor connected to an upper and lower arm circuit that generates and outputs AC power, and configured to smooth voltage pulsations,
 a noise absorbing capacitor connected to the upper and lower arm circuit, and configured to absorb noise,
 a capacitor case that houses the smoothing capacitor and the noise absorbing capacitor inside,
 a P-side bus bar connected to the noise absorbing capacitor,
 a N-side bus bar connected to the noise absorbing capacitor; and
 a ground bus bar having one end connected to the noise absorbing capacitor and the other end connected to a member having a ground potential and located outside the capacitor case.

The smoothing capacitor has a P-side electrode surface, which is the electrode surface on a high potential side of the smoothing capacitor, and a N-side electrode surface, which is a low-potential side electrode surface of the smoothing capacitor.

When a region between a P-side virtual plane along the P-side electrode surface and a N-side virtual plane along the N-side electrode surface is defined as a PN region, the entire noise absorbing capacitor and the entire ground bus bar are arranged in the PN region.

A power conversion device according to one aspect of the present disclosure includes a semiconductor module having a plurality of switching elements forming an upper and lower arm circuit that generates and outputs AC power;
 a capacitor module connected to the upper and lower arm circuit; and
 a case housing the capacitor module and the semiconductor module.

The capacitor module includes a smoothing capacitor connected to the upper and lower arm circuit, and configured to smooth voltage pulsations,
 a noise absorbing capacitor connected to the upper and lower arm circuit, and configured to absorb noise,
 a capacitor case that houses the smoothing capacitor and the noise absorbing capacitor inside,
 a P-side bus bar connected to the noise absorbing capacitor,
 a N-side bus bar connected to the noise absorbing capacitor; and
 a ground bus bar having one end connected to the noise absorbing capacitor and the other end connected to a member having a ground potential and located outside the capacitor case.

The smoothing capacitor has a P-side electrode surface, which is the electrode surface on a high potential side of the smoothing capacitor, and a N-side electrode surface, which is a low-potential side electrode surface of the smoothing capacitor.

When a region between a P-side virtual plane along the P-side electrode surface and a N-side virtual plane along the N-side electrode surface is defined as a PN region, the entire noise absorbing capacitor and the entire ground bus bar are arranged in the PN region.

BRIEF DESCRIPTION OF DRAWINGS

FIG. 8 is a flowchart showing a manufacturing process procedure for a manufacturing method of the capacitor module according to the first embodiment.

DETAILED DESCRIPTION

Figure 1:
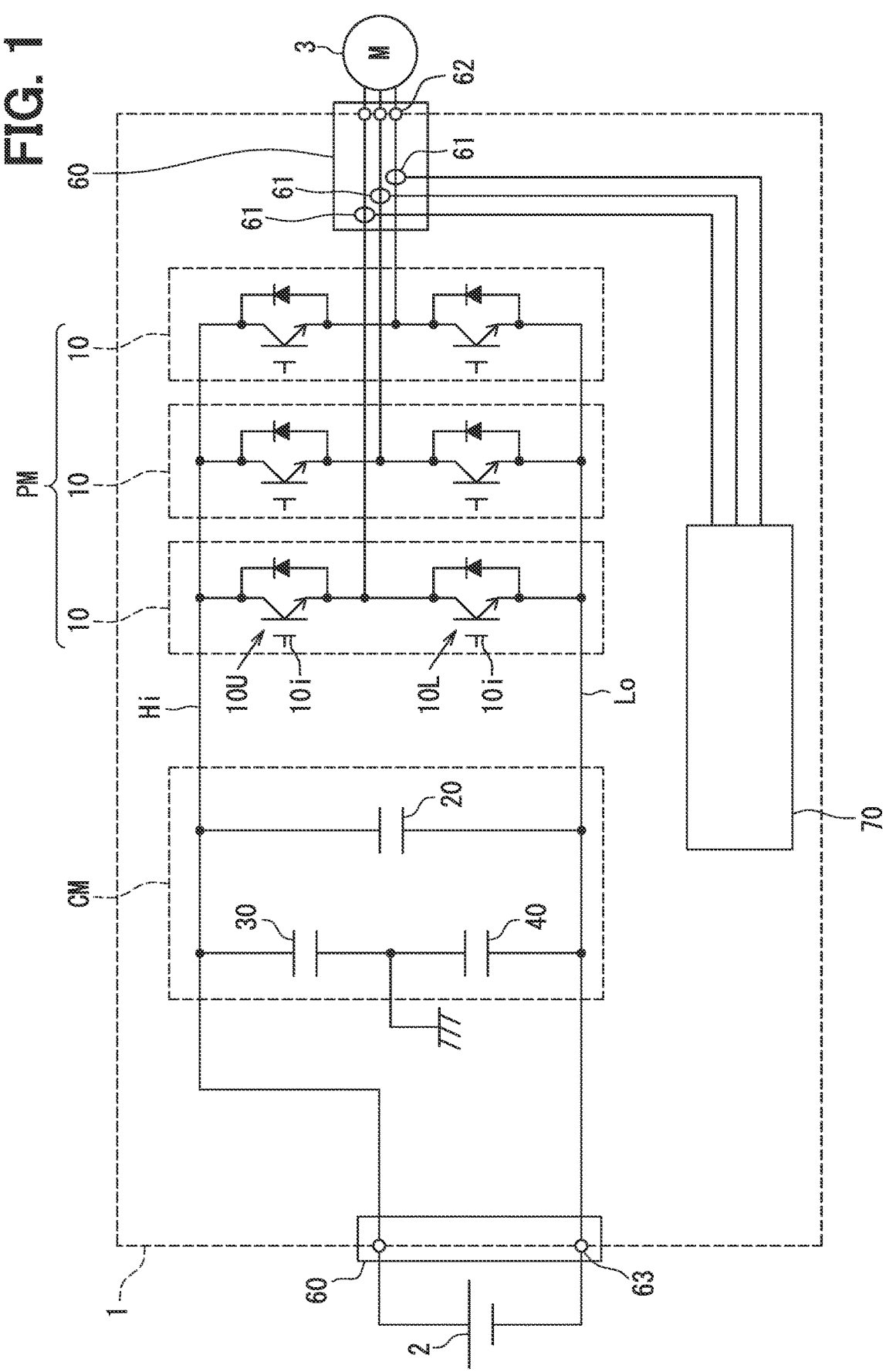
FIG. 1 is a diagram showing a circuit configuration of a power conversion device according to a first embodiment.

In an assumable example, a power conversion device converts DC power into AC power and outputs it by operating a plurality of switching elements forming an upper and lower arm circuit. This power conversion device includes a smoothing capacitor connected to the upper and lower arm circuits to smooth a voltage pulsation, and a noise absorbing capacitor connected to the upper and lower arm circuits to absorb noise.

These smoothing capacitors and noise absorbing capacitors are housed in a common case to form a capacitor module.

Depending on a space in which the capacitor module is installed, it is desirable to reduce a size (reduce a height) of the capacitor module in a direction perpendicular to an electrode surface of the smoothing capacitor. In addition, there are cases where it is desired to reduce a height of the power conversion device by reducing a height of the capacitor module.

A capacitor module and a power conversion device of which the height are lowered can be provided.

A capacitor module according to one aspect of the present disclosure includes
- a smoothing capacitor connected to an upper and lower arm circuit that generates and outputs AC power, and configured to smooth voltage pulsations,
- a noise absorbing capacitor connected to the upper and lower arm circuit, and configured to absorb noise,
- a capacitor case that houses the smoothing capacitor and the noise absorbing capacitor inside,
- a P-side bus bar connected to the noise absorbing capacitor,
- a N-side bus bar connected to the noise absorbing capacitor; and
- a ground bus bar having one end connected to the noise absorbing capacitor and the other end connected to a member having a ground potential and located outside the capacitor case.

The smoothing capacitor has a P-side electrode surface, which is the electrode surface on a high potential side of the smoothing capacitor, and a N-side electrode surface, which is a low-potential side electrode surface of the smoothing capacitor.

When a region between a P-side virtual plane along the P-side electrode surface and a N-side virtual plane along the N-side electrode surface is defined as a PN region, the entire noise absorbing capacitor and the entire ground bus bar are arranged in the PN region.

According to the capacitor module disclosed herein, the entire noise absorbing capacitor and the entire ground bus bar are arranged in the PN region. That is, the noise absorbing capacitor and the ground bus bars and are arranged so as not to protrude from the PN region. Therefore, the capacitor module CM can be miniaturized (reduced in height) in a direction perpendicular to the electrode surface of the smoothing capacitor.

A power conversion device according to one aspect of the present disclosure includes
- a semiconductor module having a plurality of switching elements forming an upper and lower arm circuit that generates and outputs AC power;
- a capacitor module connected to the upper and lower arm circuit; and
- a case housing the capacitor module and the semiconductor module.

The capacitor module includes
- a smoothing capacitor connected to the upper and lower arm circuit, and configured to smooth voltage pulsations,
- a noise absorbing capacitor connected to the upper and lower arm circuit, and configured to absorb noise,
- a capacitor case that houses the smoothing capacitor and the noise absorbing capacitor inside,
- a P-side bus bar connected to the noise absorbing capacitor,
- a N-side bus bar connected to the noise absorbing capacitor; and
- a ground bus bar having one end connected to the noise absorbing capacitor and the other end connected to a member having a ground potential and located outside the capacitor case.

The smoothing capacitor has a P-side electrode surface, which is the electrode surface on a high potential side of the smoothing capacitor, and a N-side electrode surface, which is a low-potential side electrode surface of the smoothing capacitor.

When a region between a P-side virtual plane along the P-side electrode surface and a N-side virtual plane along the N-side electrode surface is defined as a PN region, the entire noise absorbing capacitor and the entire ground bus bar are arranged in the PN region.

According to the power converter disclosed herein, the entire noise absorbing capacitor and the entire ground bus bar are arranged in the PN region. That is, the noise absorbing capacitor and the ground bus bars and are arranged so as not to protrude from the PN region. Therefore, the capacitor module can be miniaturized (reduced in height) in the direction perpendicular to the electrode surface of the smoothing capacitor, and the power conversion device can be reduced in height.

Hereinafter, a plurality of embodiments will be described with reference to the drawings. In the following embodiments, functionally or structurally corresponding parts are assigned with the same reference numerals. In the following, a vertical direction when a power conversion device is mounted on a vehicle is referred to as z direction, and one direction orthogonal to the z direction is referred to as x direction. Further, a direction orthogonal to both the z direction and the x direction is referred to as y direction. An orientation of an arrow indicating the z direction in the figure is the upper side in the vehicle mounted state.

First Embodiment

First, an outline of an electric circuit composed of the power conversion device 1 will be described with reference to FIGS. 1 and 2. The power conversion device 1 according to the present embodiment is mounted on a vehicle such as an electric vehicle or a hybrid vehicle.

The power conversion device 1 converts a DC voltage supplied from a battery 2 (a DC power supply) mounted on the vehicle into three-phase AC and outputs it to a three-phase AC type motor 3 (vehicle-mounted motor). The motor 3 functions as a traveling drive source for the vehicle. The power conversion device 1 can also convert an electric power generated by the motor 3 into a direct current and charge the battery 2. The power conversion device 1 is capable of bidirectional power conversion.

As shown in FIG. 1, the power conversion device 1 includes a control board 70, a semiconductor module PM, a capacitor module CM, and a terminal block 60.

The semiconductor module PM has a plurality of power cards 10. The power card 10 has a structure including a switching element 10i, a terminal connected to the switching element 10i, and a molding material. The molding material is made of a resin that molds the switching element 10i. The terminals include a P terminal 10P, a N terminal 10N, a 0 terminal 10O, and a signal terminal 10S shown in FIG. 2. In one example shown in FIG. 1, one power card 10 has two switching elements 10i and forms one upper and lower arm circuit.

The plurality of power cards 10 function as an inverter circuit that converts an input DC power into three-phase AC having a predetermined frequency and outputs it to the motor 3. This inverter circuit also has a function of converting AC power generated by the motor 3 into DC power. The power card 10 as an inverter circuit is provided in each of the three phases of the motor 3.

The power conversion device 1 may include a reactor, and the semiconductor module PM may include a power card connected to the reactor. The power card in this case functions as a converter circuit for boosting the DC voltage. Further, the semiconductor module PM may include both a power card that functions as an inverter circuit and a functional power card as a converter circuit.

As the switching element 10i, an n-channel type insulated gate bipolar transistor (IGBT) is adopted. The collector electrodes of the IGBTs of the upper arms 10U are connected to a high potential power line Hi. The emitter electrodes of the IGBTs of the lower arm 10L are connected to a low potential power line Lo.

The emitter electrodes of the IGBTs of the upper arms 10U and the collector electrodes of the IGBTs of the lower arms 10L are connected to each other.

Further, the semiconductor module PM has a cooler for cooling the power card 10. The cooler has a heat exchange unit (not shown) and a refrigerant pipe 12, and forms a part of a circulation path for circulating a liquid refrigerant. The heat exchange unit communicates with the refrigerant pipe 12. The heat exchange unit contacts the power card 10 via an insulator having good thermal conductivity, and cools the power card 10 whose temperature rises due to heat generated by the switching element 10i. The plurality of power cards 10 are arranged side by side in the y direction in a stacked manner. The heat exchange unit is arranged between the adjacent power cards 10. That is, the plurality of heat exchange units are alternately stacked and arranged with the power card 10.

The P terminal 10P included in the power card 10 is connected to the emitter electrode of the switching element 10i constituting the upper arm 10U. The P terminal 10P has the same potential as the high potential power line Hi. The P terminal 10P is connected to a connection portion 21b of a P-side bus bar 21, which will be described later. The N terminal 10N included in the power card 10 is connected to the collector electrode of the switching element 10i constituting the lower arm 10L. The N terminal 10N has the same potential as the low potential power line Lo. The N terminal 10N is connected to a connection portion 22b of a N-side bus bar 22, which will be described later.

The signal terminal 10S is connected to the gate electrode of the switching element 10i. The signal terminal 10S is mounted on the control board 70. The signal terminal 10S extends from the mold material toward the control board 70 in the z direction. The P terminal 10P, the N terminal 10N, and the 0 terminal 10O extend from the mold material toward an opposite side of the signal terminal 10S. The P terminal 10P, the N terminal 10N, and the 0 terminal 10O are arranged side by side in the x direction.

The capacitor module CM has a smoothing capacitor 20 and a noise absorbing capacitor. The smoothing capacitor 20 is connected between the high potential power line Hi and the low potential power line Lo. The smoothing capacitor 20 is connected in parallel with the power card 10. The smoothing capacitor 20 is connected to the upper and lower arm circuit 10U and 10L to smooth the voltage pulsation.

The noise absorbing capacitor is connected to the upper and upper arm circuit 10U and 10L to absorb noise. The noise absorbing capacitor is divided into a P-side Y capacitor 30 corresponding to the P-side noise absorbing capacitor and an N-side Y capacitor 40 corresponding to the N-side noise absorbing capacitor. One end of the P-side Y capacitor 30 is connected to the high potential power line Hi, and the other end thereof is connected to the ground. One end of the N-side Y capacitor 40 is connected to the low potential power line Lo, and the other end thereof is connected to the ground. While a plurality of smoothing capacitors 20 are connected in parallel, the P-side Y capacitor 30 and the N-side Y capacitor 40 are each composed of one.

The P-side Y capacitor 30 and the N-side Y capacitor 40 have the same capacitance, and have the same shape and physique. Each of the noise absorbing capacitors has a smaller capacitance and a smaller physique than one smoothing capacitor 20.

The control board 70 has a control unit and a drive circuit unit (a driver). The control unit generates a drive command for operating the switching element 10i based on a torque request input from a host ECU and the signals detected by various sensors. The control unit is configured to include a microcomputer, and outputs a PWM signal as a drive command. The driver controls an on/off operation of the switching element 10i according to the drive command output from the control unit.

Specific examples of the various sensors described above include a current sensor 61, a voltage sensor, a rotation angle sensor, and the like. The current sensor 61 detects a phase current flowing in the winding of each phase of the motor 3. The rotation angle sensor detects a rotation angle of the rotor of the motor 3.

The terminal block 60 includes these current sensors 61, a board, a holding terminal, an output connector terminal, and an input connector terminal (not shown). The current sensor 61 of each phase is mounted on a substrate, and the substrate is held by a resin holding base. The holding base holds an output connector terminal 62 and an input connector terminal 63. The output connector terminal 62 is connected to the winding of each phase of the motor 3 and forms a part of an energization path between the 0 terminal 10O of the power card 10 and the winding of the motor 3. The input connector terminal 63 on the high potential side is connected to the battery 2 and forms a part of the energization path between the P terminal 10P and the battery 2. The input connector terminal 63 on the low potential side is connected to the ground and forms a part of the energization path between the N terminal 10N and the ground.

Figure 2:
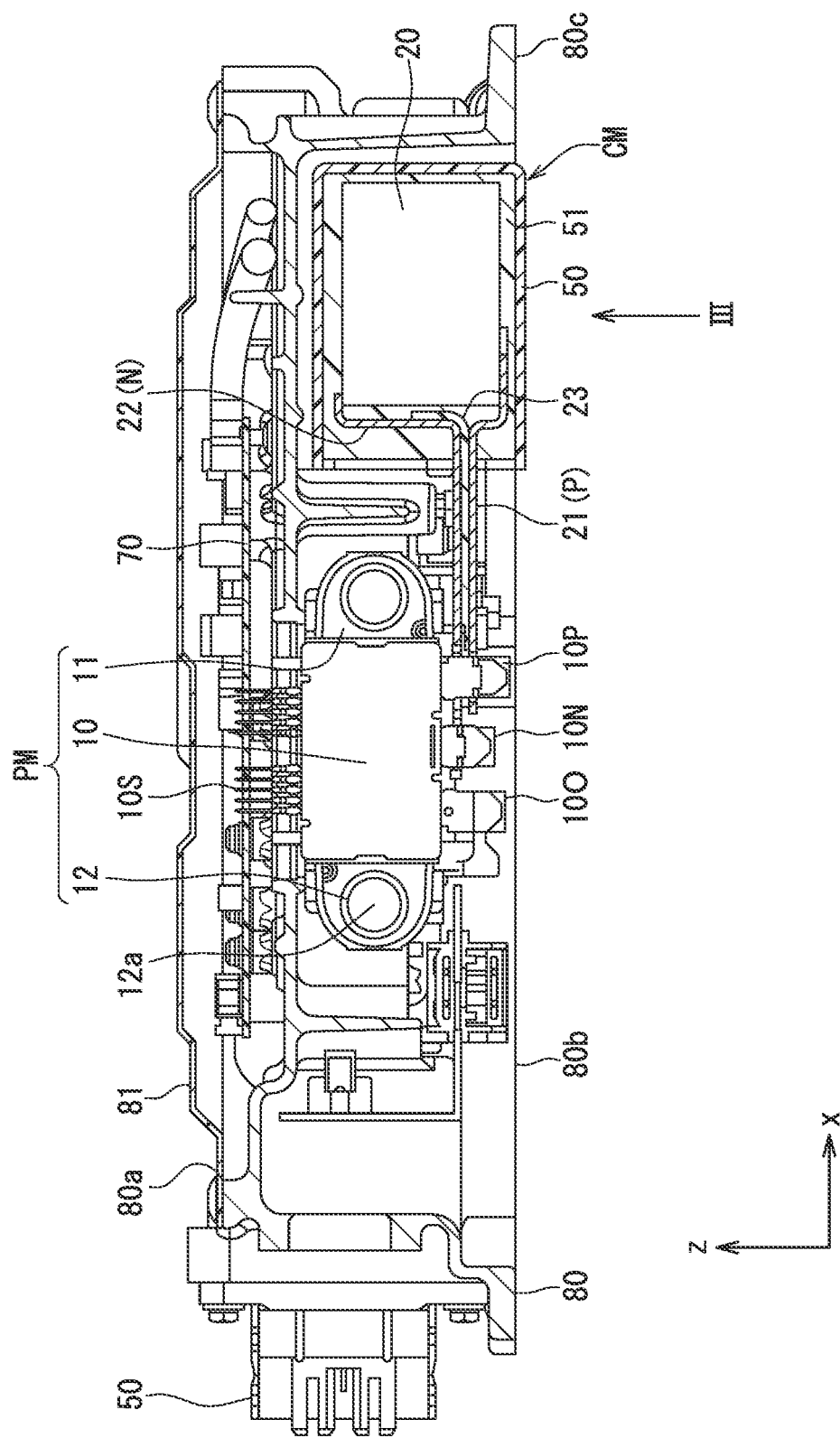
FIG. 2 is a cross-sectional view of the power conversion device according to the first embodiment.
Figure 3:
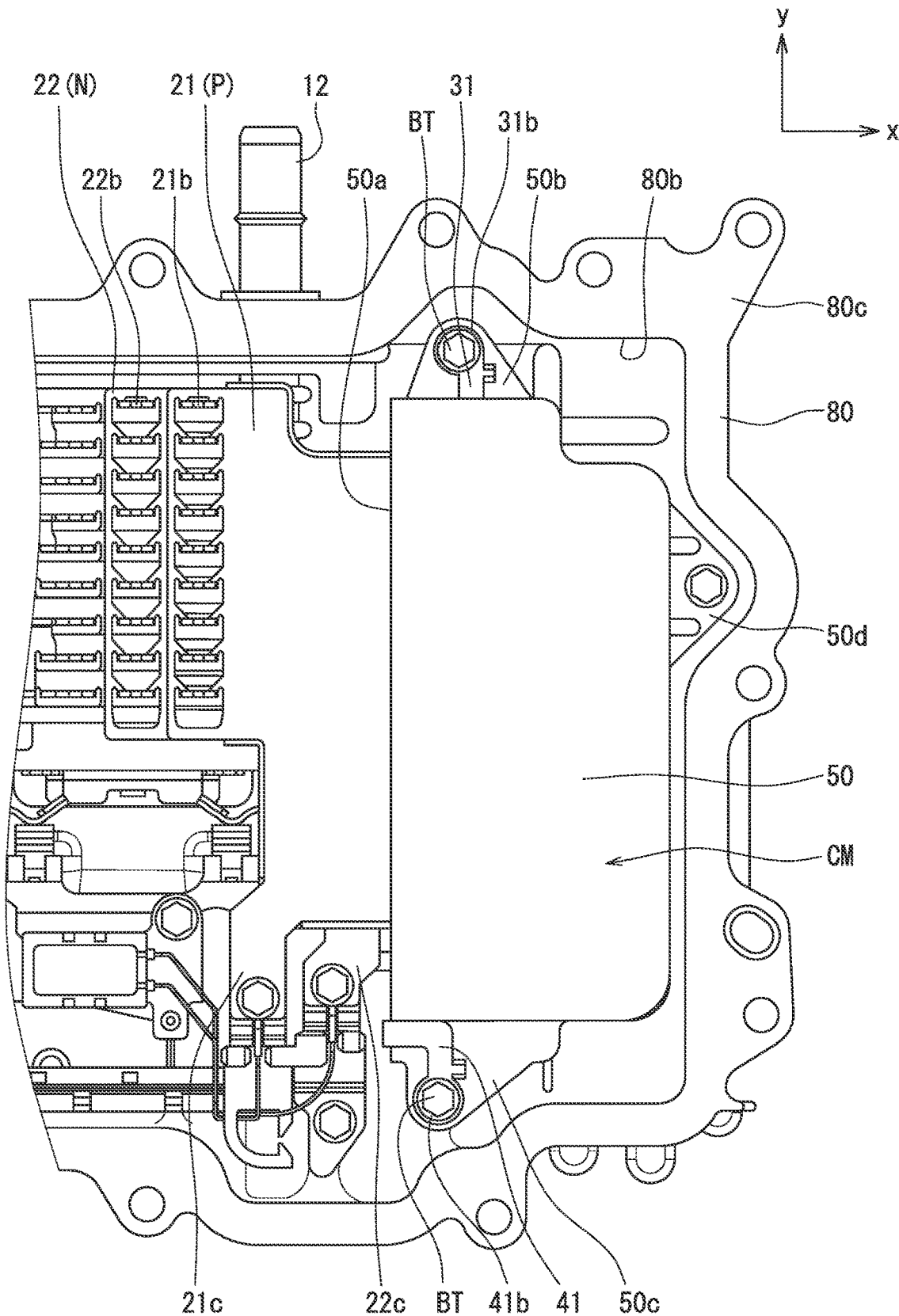
FIG. 3 is a view when viewed along an arrow III in FIG. 1.

The power conversion device 1 includes a metal housing 80 (see FIGS. 2 and 3). The housing 80 internally houses the control board 70, a semiconductor module PM, a capacitor module CM, and a terminal block 60. The housing 80 functions as a member of the ground potential.

The housing 80 has a tubular shape with both ends open. The power conversion device 1 is mounted on the vehicle so that an axial direction of the tubular shape is parallel to the z direction. A lid member 81 covers one opening 80a of the housing 80 and is attached to the housing 80. A case of the motor 3 or a case of a speed reducer attached to the motor 3 is attached to a flange 80c of the housing 80. That is, the other opening 80b of the housing 80 is covered with the motor case or the speed reducer case.

Next, the structure of the capacitor module CM will be described in more detail with reference to FIGS. 4 to 7. The x direction, y direction, and z direction described above are defined as follows. The z direction is a direction perpendicular to a plate surface of the control board 70. The y direction is a stacking direction in which a plurality of power cards 10 are stacked and arranged. The x direction is a direction perpendicular to the z direction and the y direction.

As described above, the capacitor module CM includes the P-side Y capacitor 30, the N-side Y capacitor 40 (noise absorbing capacitor), and the smoothing capacitor 20. In FIG. 1, the smoothing capacitor 20 is illustrated by one capacitor symbol, but in reality, a plurality of smoothing capacitors 20 are connected in parallel. The required large capacitance are provided.

As the noise absorbing capacitor and the smoothing capacitor 20, a film capacitor having a shape in which a film is wound is used. The physique of one capacitor and number of capacitors are adjusted by adjusting the width of the film, the number of turns, and the quantity of film capacitors. The arrangement of the plurality of capacitors is adjusted according to the shape required for the capacitor module CM. All the film capacitors included in the capacitor module CM are arranged so that a winding center line faces the z direction.

Figure 6:
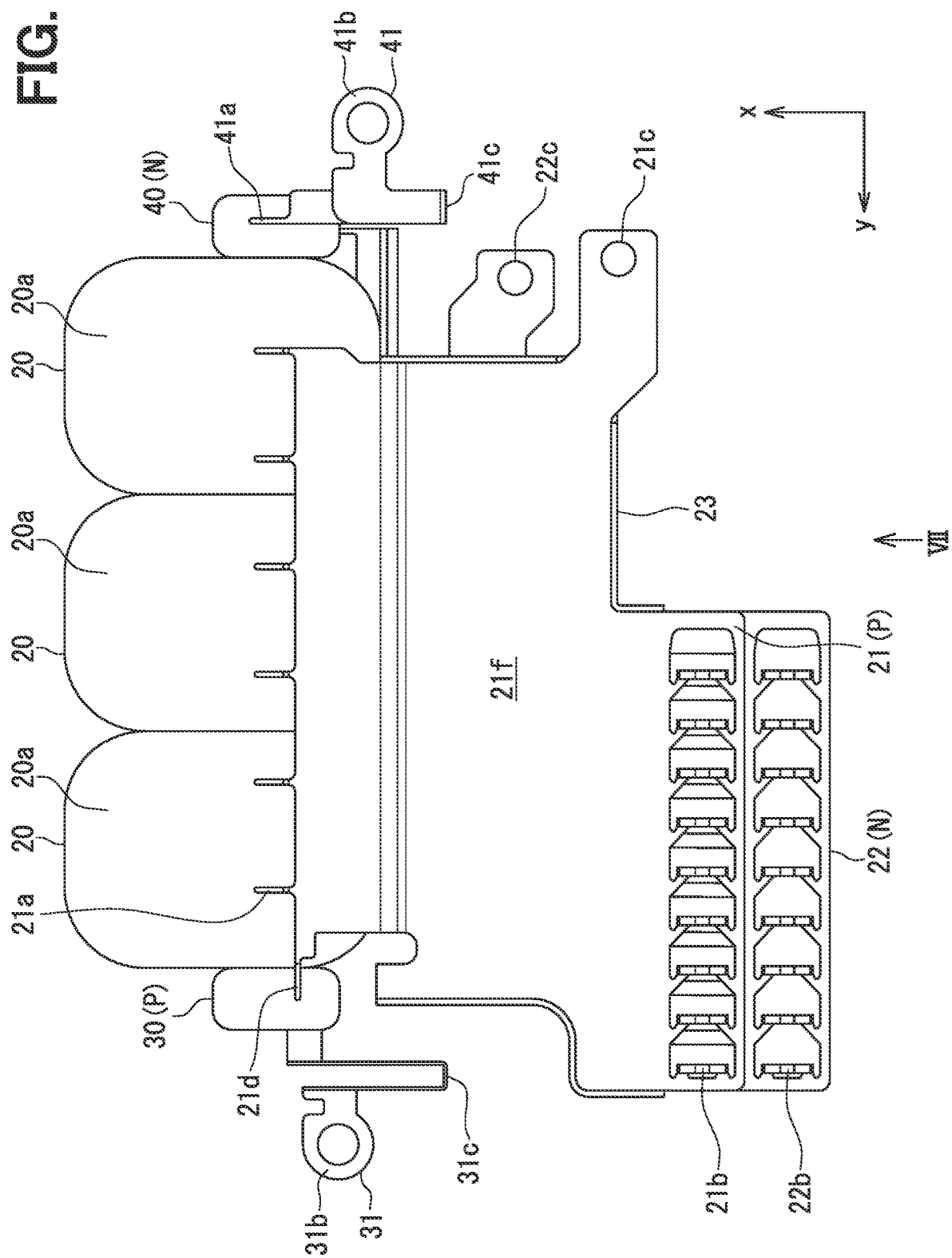
FIG. 6 is a view when viewed along an arrow VI in FIG. 5.
Figure 7:
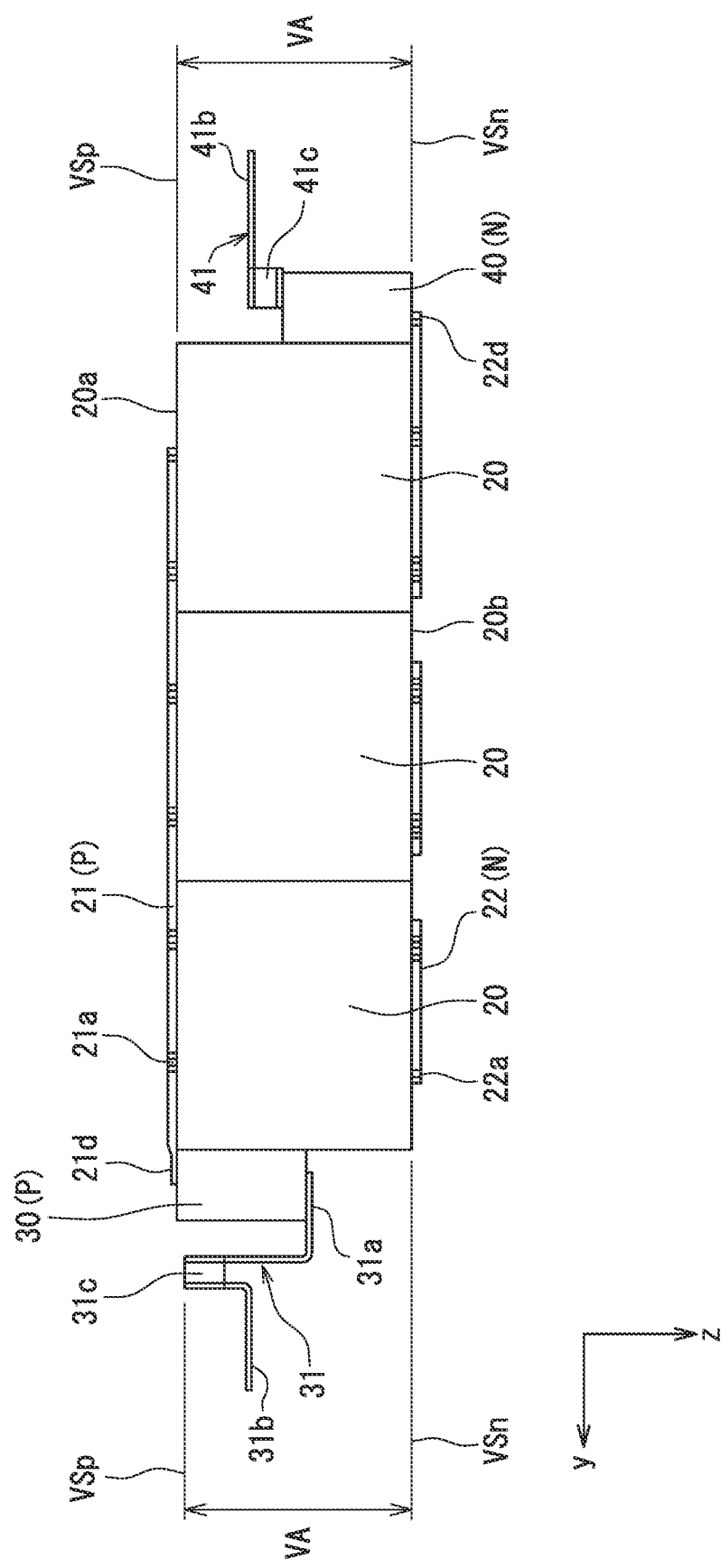
FIG. 7 is a view when viewed along an arrow VII of FIG. 6.

As shown in FIGS. 6 and 7, the entire noise absorbing capacitor is located within a range of projection of a plurality of smoothing capacitors 20 in the y direction. Further, within the range of projection, the noise absorbing capacitor is arranged at a position different from that of an electrical insulating plate 23 described later when viewed from the z direction. The P-side Y capacitor 30 and the N-side Y capacitor 40 are arranged at different positions when viewed from the z direction.

Figure 5:
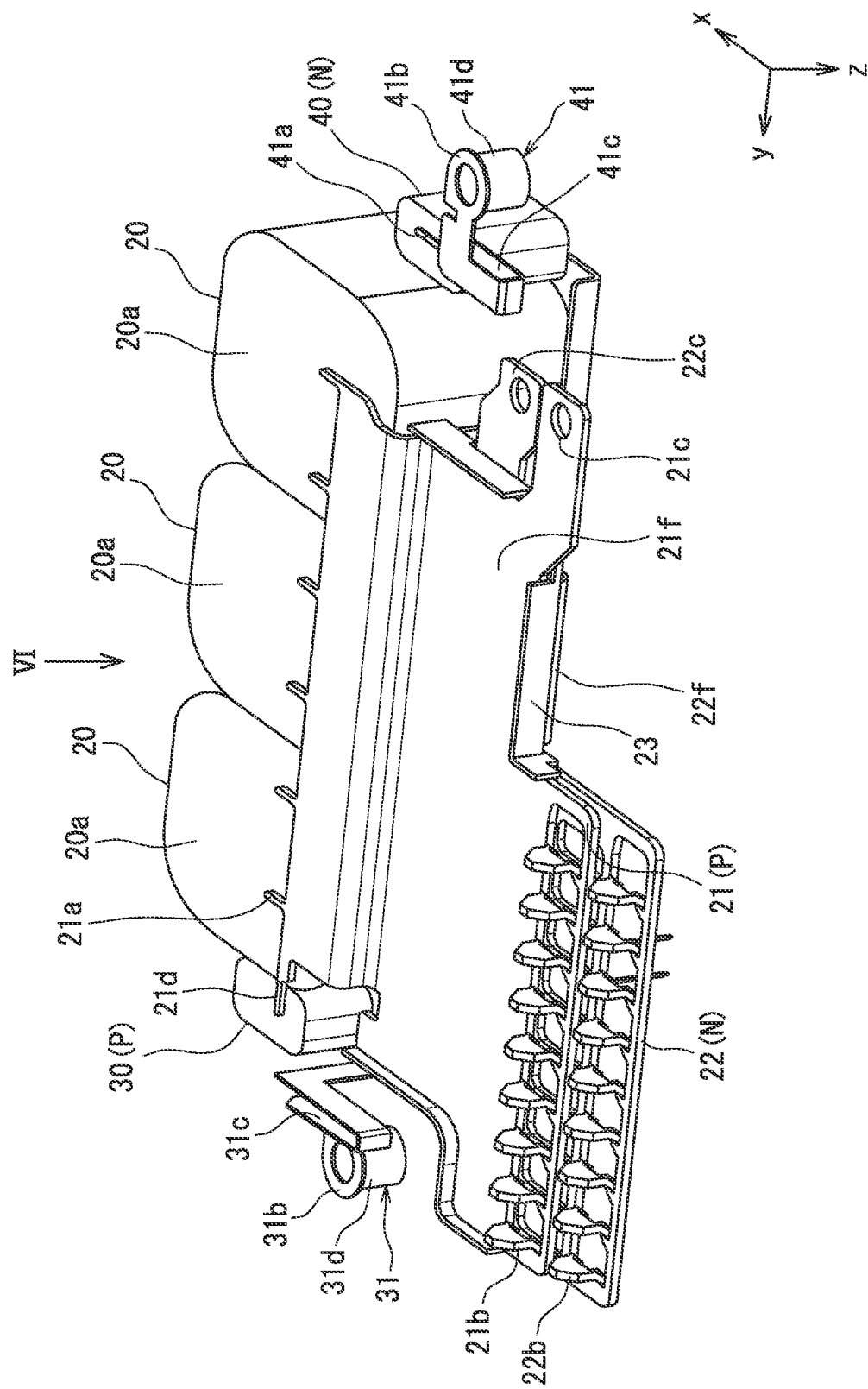
FIG. 5 is a perspective view showing a state in which a capacitor case is removed from the capacitor module.

More specifically, as shown in FIGS. 5 to 7, a plurality of smoothing capacitors 20 are arranged side by side in a straight line in the y direction. With respect to a group of smoothing capacitors 20 arranged in a row, the P-side Y capacitor 30 is arranged on one side in the y direction, and the N-side Y capacitor 40 is arranged on the other side. A side surface of the noise absorbing capacitor is adjacent to a side surface of the smoothing capacitor 20.

Further, the capacitor module CM includes the P-side bus bar 21, the N-side bus bar 22, and the electrical insulating plate 23 described above. The P-side bus bar 21 and the N-side bus bar 22 have a plate shape having conductivity. The electrical insulating plate 23 has a plate shape having electrical insulating properties.

The power card 10, the smoothing capacitor 20, the P-side Y capacitor 30, and the battery 2 are connected to the P-side bus bar 21, and the P-side bus bar 21 forms a part of the high potential power line Hi. More specifically, the P-side electrode surface 20*a* of the smoothing capacitor 20 is connected to the connection portion 21*a* of the P-side bus bar 21 by welding (see FIG. 5). The P terminal 10P of the power card 10 is connected to the connection portion 21*b* of the P-side bus bar 21 by welding (see FIGS. 2 and 3). The input connector terminal 63 on the high potential side is connected to the connection portion 21*c* of the P-side bus bar 21 with a bolt (see FIGS. 3 and 4). The high potential side electrode of the P-side Y capacitor 30 is connected to the connection portion 21*d* of the P-side bus bar 21 by welding (see FIGS. 5 to 7). In FIG. 7, a P-side flat plate portion 21*f* and the connection portion 21*b* of the P-side bus bar 21, a N-side flat plate portion 22*f* and the connection portion 22*b* of the N-side bus bar 22, and the electrical insulating plate 23 are not shown.

The power card 10, the smoothing capacitor 20, the N-side Y capacitor 40, and the ground are connected to the N-side bus bar 22. More specifically, the N-side electrode surface 20*b* of the smoothing capacitor 20 is connected to the connection portion 22*a* of the N-side bus bar 22 by welding. The N terminal 10N of the power card 10 is connected to the connection portion 22*b* of the N-side bus bar 22 by welding. The input connector terminal 63 (that is, ground) on the low potential side is connected to the connection portion 22*c* of the N-side bus bar 22 with a bolt. The low potential side electrode of the N-side Y capacitor 40 is connected to the connection portion 22*d* of the N-side bus bar 22 by welding.

The P-side bus bar 21 has a flat plate-shaped P-side flat plate portion 21*f*, and the N-side bus bar 22 has a flat plate-shaped N-side flat plate portion 22*f*. The electrical insulating plate 23 is stacked and arranged between the P-side flat plate portion 21*f* and the N-side flat plate portion 22*f*. A stacking direction of the P-side flat plate portion 21*f*, the electrical insulating plate 23, and the N-side flat plate portion 22*f* is along the z direction.

Further, the capacitor module CM includes ground bus bars 31 and 41. The ground bus bars 31 and 41 have a plate shape having conductivity.

The ground bus bar 31 connects the P-side Y capacitor 30 and the ground. More specifically, the high potential side electrode of the P-side Y capacitor 30 is connected to the connection portion 31*a* (see FIG. 7) which is one end of the ground bus bar 31. The housing 80 is connected to the connection portion 31*b*, which is the other end of the ground bus bar 31, via a bolt BT (see FIG. 3). The housing 80 functions as a member of the ground potential.

The ground bus bar 41 connects the N-side Y capacitor 40 and the ground. More specifically, the low potential side electrode of the N-side Y capacitor 40 is connected to the connection portion 41*a* (see FIG. 6) which is one end of the ground bus bar 41. The housing 80 is connected to the connection portion 41*b*, which is the other end of the ground bus bar 41, via a bolt BT (see FIG. 3). The housing 80 functions as a member of the ground potential.

Further, the capacitor module CM includes a resin capacitor case 50. The capacitor case 50 has a bag shape having one opening (an insertion port 50*a*). The insertion port 50*a* is formed so as to open in the x direction.

The capacitor case 50 houses the smoothing capacitor 20, the noise absorbing capacitor, the P-side bus bar 21, the N-side bus bar 22, the electrical insulating plate 23, and the ground bus bar 31, 41. In the housed state, the capacitor case 50 is filled with a resin material 51. The smoothing capacitor 20 and the noise absorbing capacitor are entirely sealed with the resin material 51. On the other hand, a part of the P-side bus bar 21, the N-side bus bar 22, the electrical insulating plate 23, and the ground bus bars 31 and 41 extend from the resin material 51. In other words, a part of the P-side bus bar 21, the N-side bus bar 22, the electrical insulating plate 23, and the ground bus bars 31, 41 extend from the insertion port 50*a*.

Specifically, the P-side flat plate portion 21*f* and the N-side flat plate portion 22*f* extend from the insertion port 50*a*. That is, the connection portions 21*b* and 21*c* of the P-side bus bar 21 and the connection portions 22*b* and 22*c* of the N-side bus bar 22 are exposed from the resin material 51. The ground bus bars 31 and 41 are formed with crank-shaped engaging portions 31*c* and 41*c* that engage with an edge portion of the insertion port 50*a*.

The capacitor case 50 has a plurality of fastening portions 50*b*, 50*c*, and 50*d* to be fastened and fixed to the housing 80. The two fastening portions 50*b* and 50*c* have a flange shape extending in the y direction at a position adjacent to the insertion port 50*a*. The fastening portion 50*d* is located on the opposite side of the insertion port 50*a* and has a flange shape extending in the x direction. The ground bus bars 31 and 41 are electrically connected to the housing 80 by being fastened to the housing 80 together with the fastening portions 50*b* and 50*c* by bolts BT.

The ground bus bars 31 and 41 extend from the inside to the outside of the capacitor case 50 through the insertion port 50*a*. The capacitor case 50 has a plurality of fastening portions 50*b*, 50*c*, and 50*d*. The ground bus bar 31 is fastened to the fastening portion 50*b* closest to the insertion port 50*a* among these plurality of fastening portions 50*b*, 50*c*, and 50*d*. Further, the ground bus bar 41 is fastened to the fastening portion 50*c* second closest to the insertion port 50*a* (see FIG. 3).

The ground bus bars 31 and 41 have insertion portions 31d and 41d that are inserted and fitted into the fastening portions 50b and 50c (see FIG. 5). Although not shown in FIG. 7, the insertion portions 31d and 41d have a cylindrical shape extending in the z direction, and are connected to the connection portions 31b and 41b by welding or the like.

As shown in FIG. 7, a virtual plane along the P-side electrode surface 20a of the smoothing capacitor 20 is referred to as a P-side virtual plane VSp, and a virtual plane along the N-side electrode surface 20b is referred to as a N-side virtual plane VSn. Further, a region between the P-side virtual plane VSp and the N-side virtual plane VSn is defined as a PN region VA.

The entire noise absorbing capacitor is located in the PN region VA. That is, the noise absorbing capacitor is arranged so as not to protrude from the PN region VA. In the PN region VA, the P-side Y capacitor 30 and the N-side Y capacitor 40 are arranged at different positions in the z direction. The P-side Y capacitor 30 is located closer to the P-side electrode surface 20a than the N-side Y capacitor 40. The N-side Y capacitor 40 is located closer to the N-side electrode surface 20b than the P-side Y capacitor 30. In the PN region VA, the P-side Y capacitor 30 and the N-side Y capacitor 40 are arranged at the same position in the x direction.

An electrode surface of the P-side Y capacitor 30 connected to the connection portion 21d is located on the same plane as the P-side electrode surface 20a. In other words, the two connection portions 21d and 21a formed on the P-side bus bar 21 are at the same position in the z direction. An electrode surface of the N-side Y capacitor 40 connected to the connection portion 22d is located on the same plane as the N-side electrode surface 20b. In other words, the two connection portions 22d and 22a formed on the N-side bus bar 22 are at the same position in the z direction.

The entire ground bus bars 31 and 41 are located in the PN region VA. That is, the ground bus bars 31 and 41 are arranged so as not to protrude from the PN region VA. The connection portion 31b of the ground bus bar 31 and the connection portion 41b of the ground bus bar 41 have a flat surface shape extending perpendicularly to the z direction, and are at the same position in the z direction.

Next, a method of manufacturing the capacitor module CM will be described with reference to FIG. 8.

First, in step S10 of FIG. 8, a jig (not shown) is prepared. This jig is a pedestal for holding each component constituting the capacitor module CM in a predetermined position shown in FIG. 5.

Next, in step S11, the N-side bus bar 22 is installed at a predetermined position on the pedestal. Next, in step S12, the electrical insulating plate 23 is installed at a predetermined position on the pedestal so as to be overlapped on the N-side bus bar 22. Next, in step S13, the ground bus bar 31 for the P-side Y capacitor 30 is installed at a predetermined position on the pedestal.

Next, in step S14, a plurality of smoothing capacitors 20 and N-side Y capacitors 40 are installed at predetermined positions on the pedestal so as to be overlapped on the N-side bus bar 22. Further, the P-side Y capacitor 30 is installed at a predetermined position on the pedestal so as to be overlapped on the ground bus bar 31.

Next, in step S15, the ground bus bar 41 is installed at a predetermined position on the pedestal so as to be overlapped on the N-side Y capacitor 40. Next, in step S16, the P-side bus bar 21 is installed at a predetermined position so as to be overlapped on the smoothing capacitor 20 and the P-side Y capacitor 30.

In the next step S17, the parts overlapped and installed in steps S11 to S16 are integrally held and temporarily assembled with a clamp (not shown) so as to form a structure. Next, in step S18, the connection portions 21a and 21d of the P-side bus bar 21 are welded to the P-side electrode surface 20a of the smoothing capacitor 20 and the electrode surface of the P-side Y capacitor 30. Further, the connection portions 22a and 22d of the N-side bus bar 22 are welded to the N-side electrode surface 20b of the smoothing capacitor 20 and the electrode surface of the N-side Y capacitor 40. Further, the connection portion 41a of the ground bus bar 41 is welded to the electrode surface of the N-side Y capacitor 40, and the connection portion 31a of the ground bus bar 31 is welded to the electrode surface of the P-side Y capacitor 30.

In the next step S19, the clamp is removed from the structure temporarily assembled as described above, and the structure is inserted into the inside of the capacitor case 50 from the insertion port 50a. In the next step S20, the molten resin is injected into the inside of the capacitor case 50 and potting is performed. As a result, the welded portions described above are sealed with the resin material 51.

According to the above described configuration, following advantages can be achieved.

In the present embodiment, the entire noise absorbing capacitor and the entire ground bus bars 31 and 41 are arranged within the PN region VA. That is, the noise absorbing capacitor and the ground bus bars 31 and 41 are arranged so as not to protrude from the PN region VA. Therefore, the capacitor module CM can be miniaturized (reduced in height) in the direction (z direction) perpendicular to the electrode surface of the smoothing capacitor 20.

Further, the capacitor module CM with reduced height described above is arranged side by side with the semiconductor module PM in the direction perpendicular to the z direction. Therefore, as the height of the capacitor module CM is reduced, the height of the power conversion device 1 can also be reduced. Further, the terminal block 60 is also arranged side by side with the capacitor module CM in the direction perpendicular to the z direction. Therefore, it is possible to reduce the height of the power conversion device 1 due to the reduction of the height of the capacitor module CM.

Further, in the present embodiment, the P-side bus bar 21 has the flat plate-shaped P-side flat plate portion 21f, and the N-side bus bar 22 has the flat plate-shaped N-side flat plate portion 22f. The P-side flat plate portion 21f and the N-side flat plate portion 22f are laminated and arranged with the electrical insulating plate 23 interposed therebetween. Therefore, the P-side flat plate portion 21f and the N-side flat plate portion 22f can be brought closer to each other in the z direction. Therefore, if the directions of the currents flowing through the flat plate portions are opposite to each other, the inductances can be mutually canceled and the electric power energization loss can be reduced.

Further, in the present embodiment, the noise absorbing capacitor is arranged at a position different from that of the electrical insulating plate 23 when viewed from the z direction. Therefore, when connecting the P-side bus bar 21 and the N-side bus bar 22 to the noise absorbing capacitor, the above connection can be realized without providing a through hole for passing these bus bars in the electrical insulating plate 23 and without impairing the above-mentioned reduction in height.

Further, in the present embodiment, the P-side Y capacitor 30 and the N-side Y capacitor 40 are arranged at different positions when viewed from the z direction. Therefore, it is possible to secure a large physique in the z-direction of each capacitor as compared with the case where these noise-absorbing capacitors are arranged so as to overlap each other in the z-direction while preventing the noise-absorbing capacitors from protruding from the PN region VA.

Further, in the present embodiment, the capacitor module CM is housed in a common housing 80 together with the components (semiconductor module PM) forming the upper and lower arm circuits. The housing 80 is made of metal and functions as a member having a ground potential. The capacitor case 50 has the fastening portions 50*b* and 50*c* that are fastened and fixed to the housing 80. The ground bus bars 31 and 41 are electrically connected to the housing 80 by being fastened to the housing 80 together with the fastening portions 50*b* and 50*c*.

According to this configuration, the work of fastening the capacitor case 50 to the housing 80 and the work of electrically connecting the ground bus bars 31 and 41 to the housing 80 can be performed together. Therefore, it is possible to improve the work efficiency as compared with the case where these works are performed separately.

Further, in the present embodiment, the capacitor case 50 has the insertion port 50*a* into which the smoothing capacitor 20 and the noise absorbing capacitor are inserted. The ground bus bars 31 and 41 extend from the inside to the outside of the capacitor case 50 through the insertion port 50*a*.

The ground bus bar 31 is fastened to the housing 80 at the fastening portion 50*b* closest to the insertion port 50*a* among the plurality of fastening portions 50*b*, 50*c*, and 50*d*. Further, the ground bus bar 32 is fastened to the housing 80 at the fastening portion 50*c* second closest to the insertion port 50*a*. Therefore, the lengths of the ground bus bars 31 and 32 can be shortened as compared with the case where the ground bus bar is fastened to the fastening portion 50*d* located at a position far from the insertion port 50*a*.

Further, in the present embodiment, a part of the ground bus bars 31 and 41 extends from the inside to the outside of the capacitor case 50 through the insertion port 50*a*. The insertion port 50*a* is formed so as to open in the x direction. Therefore, the direction in which the ground bus bars 31 and 41 extend from the insertion port 50*a* can be set to a direction parallel to the z direction (x direction). Therefore, it is possible to easily arrange the ground bus bars 31 and 41 so as not to protrude from the PN region VA as compared with the case where the insertion port opens in the z direction.

OTHER EMBODIMENTS

Although the multiple embodiments of the present disclosure have been described above, not only the combinations of the configurations explicitly shown in the description of each embodiment, but also the configurations of multiple embodiments may be partially combined even if those are not explicitly shown unless a problem arises in the combination in particular. Unspecified combinations of the configurations described in the plurality of embodiments and the modification examples are also disclosed in the following description.

The electrode surface of the P-side Y capacitor 30 connected to the connection portion 21*d* is located on the same plane as the P-side electrode surface 20*a* in the embodiment shown in FIG. 7. On the other hand, the electrode surface of the P-side Y capacitor 30 may be located closer to the N-side electrode surface 20*b* than the P-side electrode surface 20*a*. Similarly, the electrode surface of the N-side Y capacitor 40 connected to the connection portion 22*d* may be located closer to the P-side electrode surface 20*a* than the N-side electrode surface 20*b*.

In the embodiment shown in FIGS. 5 and 6, the noise absorbing capacitor is arranged at a position different from that of the electrical insulating plate 23 when viewed from the z direction. On the other hand, the noise absorbing capacitor may be arranged at a position overlapping with the electrical insulating plate 23 when viewed from the z direction. In other words, if the entire ground bus bars 31 and 41 are located within the PN region VA, the noise absorbing capacitors may be arranged side by side with the electrical insulating plate 23 in the z direction.

In the embodiment shown in FIGS. 5 and 7, the P-side Y capacitor 30 and the N-side Y capacitor 40 are arranged at different positions when viewed from the z direction. On the other hand, these capacitors may be arranged at overlapping positions when viewed from the z direction. In other words, as long as the entire noise absorbing capacitor is located in the PN region VA, these capacitors may be arranged side by side in the z direction.

In the embodiment shown in FIG. 3, the ground bus bars 31 and 41 are connected to the housing 80 by bolts BT together with the fastening portions 50*b* and 50*c* of the capacitor case 50. On the other hand, the ground bus bars 31 and 41 may be connected to the housing 80 without using the capacitor case 50.

Figure 4:
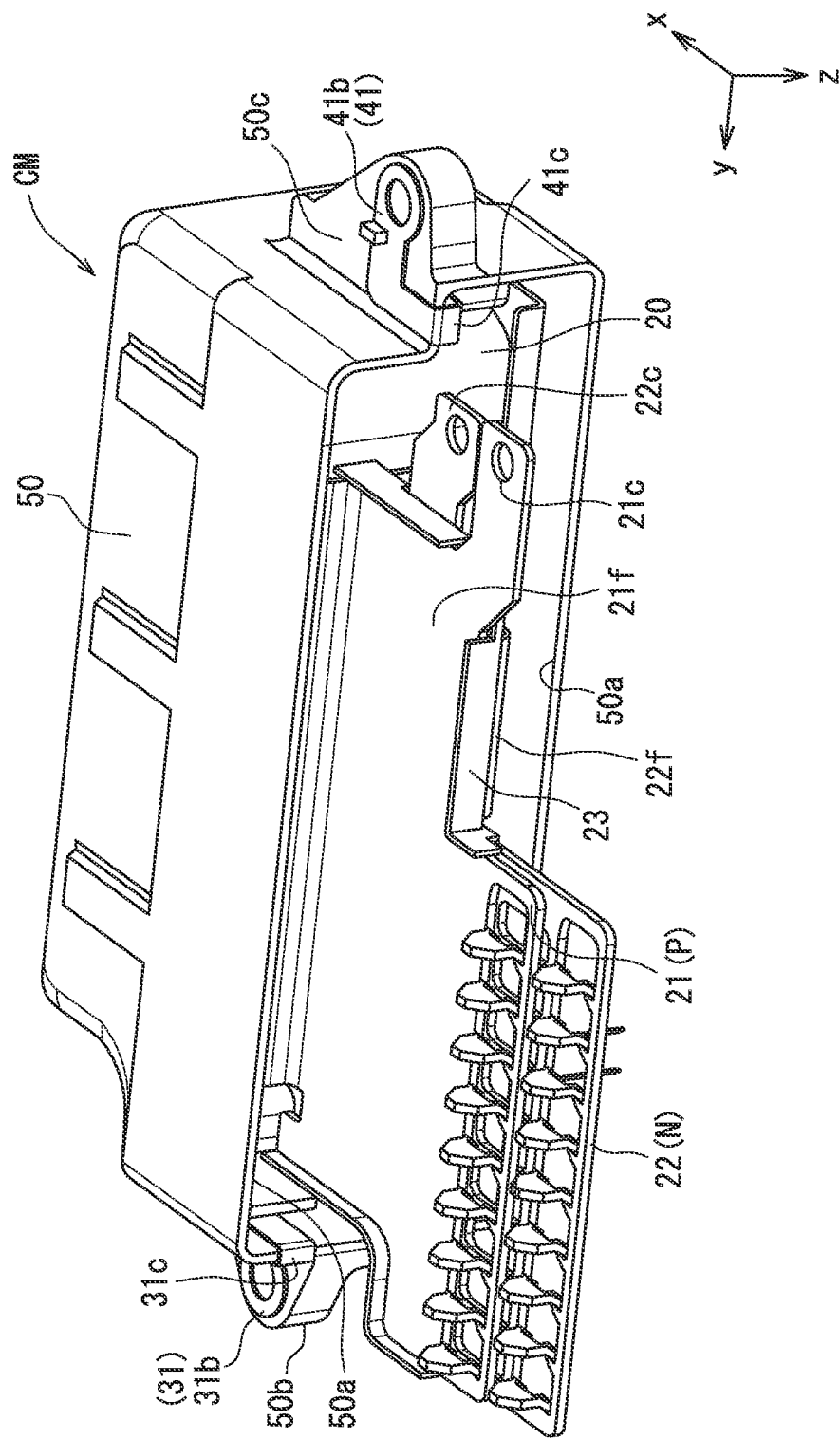
FIG. 4 is a perspective view of a capacitor module according to the first embodiment.

In the embodiment shown in FIG. 4, the insertion port 50*a* for inserting the smoothing capacitor 20 is used in extending the ground bus bars 31 and 41 from the inside to the outside of the capacitor case 50. On the other hand, a through hole different from the insertion port 50*a* may be formed in the capacitor case 50, and the ground bus bars 31 and 41 may be extended to the outside of the case through the through hole.

In the embodiment shown in FIG. 4, although the insertion port 50*a* of the capacitor case 50 is formed so as to open in the x direction, the insertion port 50*a* may be formed so as to open in the y direction or to open in the z direction.

The power conversion device 1 shown in FIG. 1 includes one inverter circuit on the assumption that the number of motors 3 to be supplied with power is one.

On the other hand, the power conversion device 1 may be a power conversion device 1 having a plurality of motors as power supply targets and having a plurality of inverter circuits.

The semiconductor module PM according to the first embodiment has a structure in which both sides of the power card 10 are cooled by a cooler. On the other hand, a structure may be used in which one side of the power card 10 is cooled by a cooler.

What is claimed is:
1. A capacitor module, comprising:
a smoothing capacitor connected to an upper and lower arm circuit that generates and outputs AC power, and configured to smooth voltage pulsations;
a noise absorbing capacitor connected to the upper and lower arm circuit, and configured to absorb noise;
a capacitor case that houses the smoothing capacitor and the noise absorbing capacitor inside;
a P-side bus bar connected to the noise absorbing capacitor;
a N-side bus bar connected to the noise absorbing capacitor; and
a ground bus bar having one end connected to the noise absorbing capacitor and the other end connected to a member having a ground potential and located outside the capacitor case, wherein the smoothing capacitor has a P-side electrode surface, which is on a high potential side of the smoothing capacitor, and a N-side electrode surface, which is is on a low-potential side electrode surface of the smoothing capacitor, when a region between a P-side virtual plane along the P-side electrode surface and a N-side virtual plane along the N-side electrode surface is defined as a PN region, the entire noise absorbing capacitor and the entire ground bus bar are arranged in the PN region, the noise absorbing capacitor comprises a P-side noise absorbing capacitor connected to the P-side bus bar and an N-side noise absorbing capacitor connected to the N-side bus bar, and the P-side noise absorbing capacitor and the N-side noise absorbing capacitor are arranged at positions separated from each other in a direction perpendicular to the P-side electrode surface and the N-side electrode surface.

2. The capacitor module according to claim 1, further comprising:

an electrical insulating plate laminated and arranged between the P-side bus bar and the N-side bus bar, wherein the P-side bus bar has a P-side flat plate portion having a flat plate shape and facing the electrically insulating plate, the N-side bus bar has a N-side flat plate portion having a flat plate shape and facing the electrically insulating plate, and the noise absorbing capacitor is arranged at a position different from the electrically insulating plate when viewed from a direction perpendicular to the P-side electrode surface and the N-side electrode surface.

3. The capacitor module according to claim 1, wherein components forming the upper and lower arm circuit are housed in a housing that functions as a member having the ground potential, the capacitor case has a fastening portion that is fastened and fixed to the housing, and the ground bus bar is electrically connected to the housing by being fastened to the housing together with the fastening portion.

4. The capacitor module according to claim 3, wherein the capacitor case has an insertion port into which the smoothing capacitor and the noise absorbing capacitor are inserted, the ground bus bar extends from an inside to an outside of the capacitor case through the insertion port, the capacitor case has a plurality of fastening portions, and the ground bus bar is fastened to the housing together with the fastening portion closest to the insertion port.

5. The capacitor module according to claim 1, wherein the capacitor case has an insertion port into which the smoothing capacitor and the noise absorbing capacitor are inserted in a direction, the insertion port is formed so that the direction to be inserted is parallel to the P-side electrode surface and the N-side electrode surface, and the ground bus bar extends from an inside to an outside of the capacitor case through the insertion port.

6. A power conversion device, comprising:

a semiconductor module having a plurality of switching elements forming an upper and lower arm circuit that generates and outputs AC power;

a capacitor module connected to the upper and lower arm circuit; and a case housing the capacitor module and the semiconductor module, wherein the capacitor module comprises:

a smoothing capacitor connected to the upper and lower arm circuit, and configured to smooth voltage pulsations, a noise absorbing capacitor connected to the upper and lower arm circuit, and configured to absorb noise;

a capacitor case that houses the smoothing capacitor and the noise absorbing capacitor inside;

a P-side bus bar connected to the noise absorbing capacitor;

a N-side bus bar connected to the noise absorbing capacitor; and a ground bus bar having one end connected to the noise absorbing capacitor and the other end connected to a member having a ground potential and located outside the capacitor case, the smoothing capacitor has a P-side electrode surface, which is on a high potential side of the smoothing capacitor, and a N-side electrode surface, which is on a low-potential side electrode surface of the smoothing capacitor, when a region between a P-side virtual plane along the P-side electrode surface and a N-side virtual plane along the N-side electrode surface is defined as a PN region, the entire noise absorbing capacitor and the entire ground bus bar are arranged in the PN region, the noise absorbing capacitor comprises a P-side noise absorbing capacitor connected to the P-side bus bar and an N-side noise absorbing capacitor connected to the N-side bus bar, and the P-side noise absorbing capacitor and the N-side noise absorbing capacitor are arranged at positions separated from each other in a direction perpendicular to the P-side electrode surface and the N-side electrode surface.

7. The capacitor module according to claim 1, wherein the entire ground bus bar is arranged in the PN region.

8. The capacitor module according to claim 1, wherein a z direction is perpendicular to the P-side electrode surface and the N-side electrode surface, and a region, in which the P-side noise absorbing capacitor is located in the z direction, and a region, in which the N-side noise absorbing capacitor is located in the z direction, at least overlap one another.

9. The capacitor module according to claim 1, wherein the smoothing capacitor comprises a plurality of smoothing capacitors arranged in a predetermined direction, and the P-side noise absorbing capacitor and the N-side noise absorbing capacitor are arranged in the predetermined direction with respect to the smoothing capacitors.

10. The capacitor module according to claim 9, wherein the entire P-side noise absorbing capacitor and the entire N-side noise absorbing capacitor are arranged in a region in which the smoothing capacitors are projected in the predetermined direction.

11. The capacitor module according to claim 9, wherein the smoothing capacitors are arranged in a singular row.

12. The capacitor module according to claim 1, wherein
- the P-side noise absorbing capacitor is closer to the P-side electrode surface than the N-side noise absorbing capacitor, and
- the N-side noise absorbing capacitor is closer to the N-side electrode surface than the P-side noise absorbing capacitor.

13. The capacitor module according to claim 1, wherein
- the smoothing capacitor comprises a plurality of smoothing capacitors,
- each of the P-side noise absorbing capacitor, the N-side noise absorbing capacitor, and the smoothing capacitors is a film capacitor in which a film is wound,
- a z direction is perpendicular to the P-side electrode surface and the N-side electrode surface, and
- each of the P-side noise absorbing capacitor, the N-side noise absorbing capacitor, and the smoothing capacitors, is arranged such that a center line, around which the film is wound, is along the z direction.

\* \* \* \* \*